United States Patent [19]

Pierron et al.

[11] 4,213,589

[45] Jul. 22, 1980

[54] CLAMP FOR SECURING ROUND ARTICLES

[75] Inventors: Claude Pierron, St. Ismier, France; Johannes Kirchgaesser, Steinen, Fed. Rep. of Germany

[73] Assignee: A. Raymond, Loerrach, Fed. Rep. of Germany

[21] Appl. No.: 933,622

[22] Filed: Aug. 14, 1978

[30] Foreign Application Priority Data

Sep. 8, 1977 [DE] Fed. Rep. of Germany ....... 2740376

[51] Int. Cl.² .................. F16L 3/08; A44B 21/00
[52] U.S. Cl. .................. 248/74 R; 24/73 AP; 24/254; 248/74 A
[58] Field of Search .................. 248/74 R, 74 PB, 67, 248/71; 16/DIG. 13, 172; 24/73 AP, 254, 237, 233

[56] References Cited

U.S. PATENT DOCUMENTS

| 2,787,435 | 4/1957 | Shields | 24/237 X |
|---|---|---|---|
| 3,883,929 | 5/1975 | Fortsch | 24/254 X |
| 3,905,570 | 9/1975 | Nieuwveld | 248/71 |
| 3,918,758 | 11/1975 | Fournier | 24/233 X |
| 3,944,177 | 3/1976 | Yoda | 248/74 PB |
| 3,954,238 | 5/1976 | Nivet | 248/74 PB |
| 4,029,277 | 6/1977 | Bulanda | 248/74 R |

FOREIGN PATENT DOCUMENTS

| 864962 | 3/1971 | Canada . |
|---|---|---|
| 1926820 | 3/1973 | Fed. Rep. of Germany . |
| 2446113 | 4/1975 | Fed. Rep. of Germany . |
| 2455866 | 6/1975 | Fed. Rep. of Germany . |

Primary Examiner—James T. McCall
Attorney, Agent, or Firm—Finnegan, Henderson, Farabow, Garrett & Dunner

[57] ABSTRACT

Disclosed is a clamp for securing a round article to a support plate. The clamp includes a generally channel-shaped body having a clip which cooperates with one of the legs of the body to retain the article in the channel opening. The clip has a head having an arcuate surface engageable with a surface portion carried by the other leg of the channel-shaped body to prevent removal of the article from the clamp upon application of a tensile force on the article in the direction of the clamp opening. To remove the article, the clip is manually displaced toward the base of the channel body to open the clamp. In another embodiment, a pair of clips lie in opposition one to the other and each clip cooperates with a surface portion carried by a corresponding leg of the clamp to preclude removal of the article from the clamp upon application of a tensile force in a direction tending to remove the article from the clamp through its opening.

12 Claims, 11 Drawing Figures

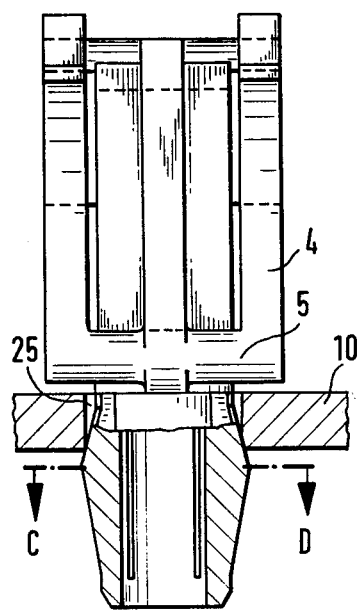
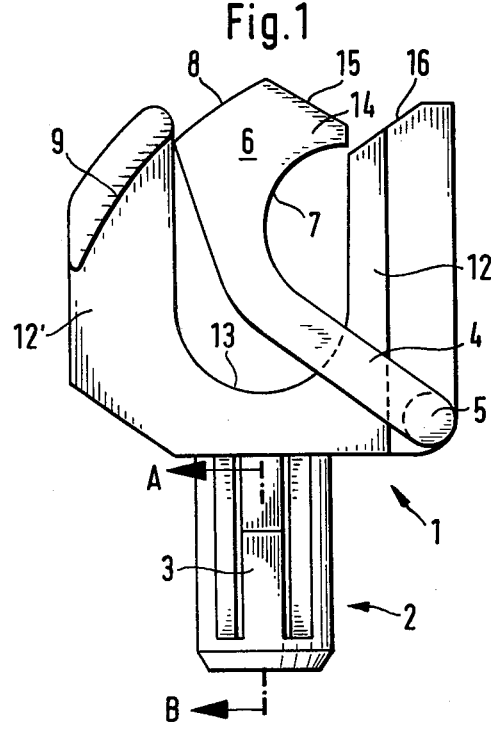
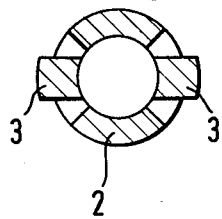
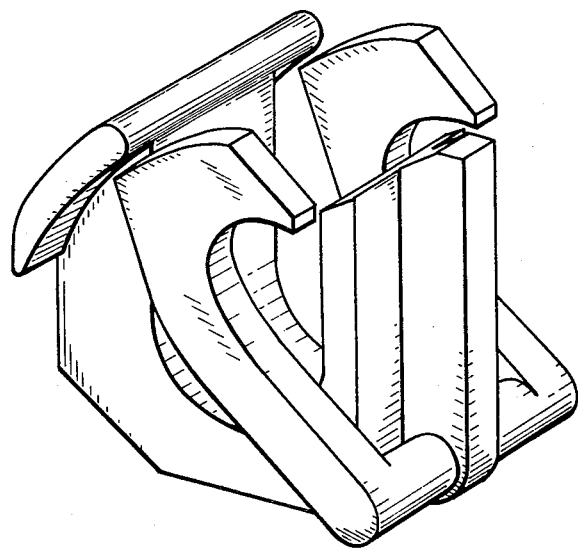

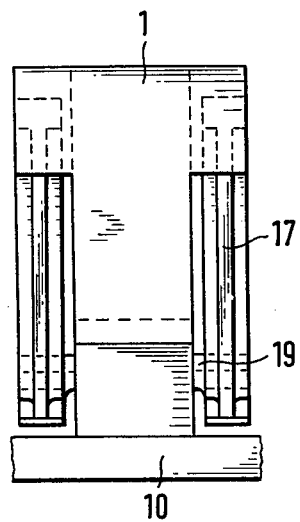
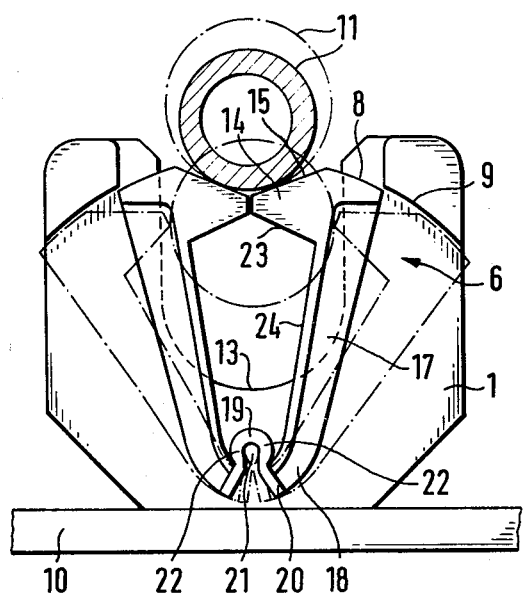
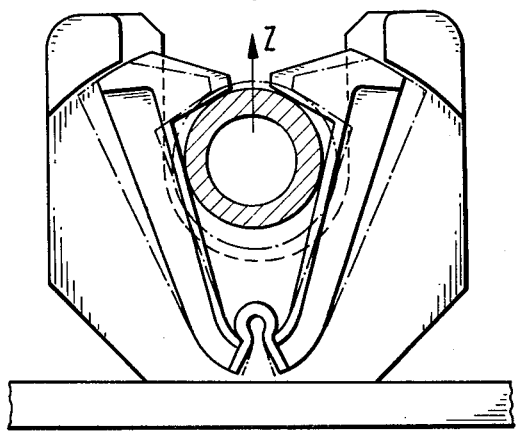

CLAMP FOR SECURING ROUND ARTICLES

BACKGROUND OF THE INVENTION

The present invention relates to a resilient clamp for securing round articles of different diameters to a support and particularly relates to a clamp formed of a plastic material for securing pipes, cables and the like to supports, for example, the bodyplates of motor vehicles.

For securing round articles to supports, various clamps having resilient clamping walls, clips or spring-like tongues are known. By utilizing these devices, round articles within a given range of diameters can be clamped with a varying degree of force to a support. The narrowed channel opening, characteristic of clamps of this type, is widened in accordance with the diameter of the article to be secured as the latter is inserted into the clamp, the resilient walls of the clamp defining the opening normally reverting to their original position or a biased position against the article upon full insertion of the article into the clip. (See for example British Pat. No. 1,155,473 or West German Utility Pat. No. 76 16 468). In these devices, the round articles to be secured can be readily inserted by hand. However, the articles can also be pulled from the devices just as easily. Consequently, these prior clamps are at best useful only for exchanging faulty cables or pipes. Often, the installed cables or pipes jump or pop out of the clamp because of vibrations or repairs accomplished in the immediate vicinity of the clamps. This may lead to damage if, during the construction or operation of motor vehicles for example, the pipes or cable get into the range of action of moving parts and are thereby destroyed. Consequently, other than for exchanging faulty cables or pipes, the small holding face of the prior clamps is undesirable. Large or substantial holding forces provided in clamps of this type, however, usually increase the difficulty in inserting the round article into the clamp.

SUMMARY OF THE PRESENT INVENTION

It is therfore a primary object of the present invention to provide a one-piece clamp formed of plastic material which will prevent the article clamped from jumping or popping out of the clamp or loosening with respect to the clamp without sacrificing ease of insertion of the article into the clamp and its removal therefrom.

This object is achieved in the present invention by providing a clamp in the form of a channel-shaped body having a clip flexibly connected to the body in the area of the channel base by a swivel or pivot pin. The clip includes a head adjacent its distal end provided with a clamping surface for engaging the round article. An outer surface of the clamping head is arcuately shaped and moves past a support wall which is likewise arcuately shaped and projects from one of the legs of the channel body. Preferably, these arcuate surfaces lie along the arcs of circles having common midpoints or centers coincident with the axis of rotation of the clip.

It is a principal feature of the present invention that tensile forces on the round article carried by the clamp in a direction tending to remove the article from the clamp through the channel opening causes the two opposed arcuately shaped walls to abut one another as a result of the resilient flexing of the swivel pin. Thus, the frictional resistance prevents the clip from swiveling back and loosening the clamp. On the other hand, the clip can be readily bent back manually when there is no load on the round article so that the article can be removed without effect and, if necessary, replaced by another article.

The clamp of one embodiment of the present invention is designed such that the round article is clamped between a pair of axially spaced clips and a leg or side wall of the channel body. In this manner, the clamp can be compact and fabricated without problems. Also, by inclining or bevelling the outer surfaces of the heads and one of the legs of the channel body to guide the article against the heads, the heads of the clips can be readily urged toward the opposite side of the clamp by simple pressure of the article, e.g. cables or pipes, on these surfaces to insert the article into the clamp so that tools for fitting the article to the clamp are not required.

In another embodiment of the present invention, the clamp has at least two counter-acting clips in opposition one to the other. Thus, the article is held between the clips rather than between clips and the leg of the channel-shaped body as in the first embodiment.

To achieve the above-identified and other objects and in accordance with the purpose of the present invention, as embodied and broadly described herein, a clamp for securing a generally round article of varying diameter to a support of the present invention comprises a generally channel-shaped body having a base and a pair of legs spaced one from the other and defining an opening therebetween, means carried by the body for securing the clamp to the support, a clip pivotally carried by the body for movement through at least part of the opening and between a position for retaining the article in the clamp and a position for opening the clamp to receive the article in or remove the article from the clamp, the clip having a clamping head including a first surface for engaging the article to retain the article in the clamp, one of the legs having a surface portion in opposition to the head when the head retains the article in the clamp, the head having a second surface engageable with the surface portion of the one leg in response to a force on the article engaged by the clamping head surface in a direction away from the base and outwardly of the opening to retain the clip substantially in its article retaining position.

In one embodiment of the present invention, the clip is pivoted to the channel-shaped body by a pin located adjacent the juncture of the one leg and base and extends across the opening whereby movement of the article engaged by the first surface of the head of the clip in a direction outwardly of the clamp tends to flex the clip about the pin into frictional engagement with the surface portion. This frictional engagement prevents movement of the clip in a direction tending to open the clamp. In another embodiment, a pair of clips are in opposition one to the other and pivoted about a location medially of the base of the channel-shaped body between its legs. The heads of these clips likewise cooperate with surface portions on the legs to prevent opening movement of the clips in response to a force on the article tending to remove the article from the opening of the channel-shaped body.

The accompanying drawings which are incorporated in and constitute a part of the specification illustrate two embodiments of the invention and, together with the description, serve to explain the principles of the invention.

BRIEF DESCRIPTION OF THE DRAWINGS

FIG. 9 is a front elevational view of a clamp body of another embodiment of the present invention;

FIG. 10 is a side elevational view of the clamp illustrated in FIG. 9 with large and small diameter articles illustrated upon inserting or removing movement of the round article relative to the clamp; and FIG. 11 is a side elevational view of the clamp of FIG. 10 illustrating its action in connection with clamping articles having different diameters and when subjected to a tensile force Z.

DESCRIPTION OF A PREFERRED EMBODIMENT

Reference will now be made in detail to the present preferred embodiment of the invention, an example of which is illustrated in the accompanying drawings.

Figure 7:
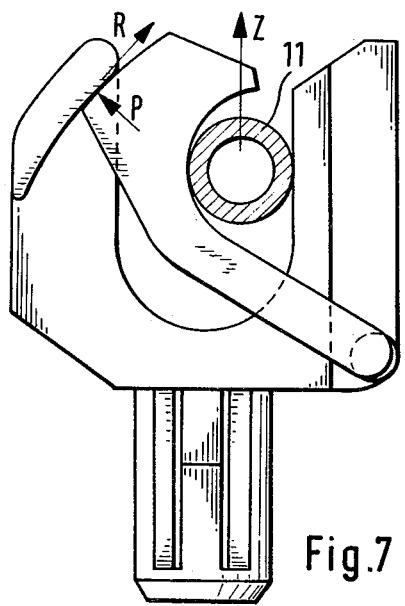
FIG. 7 is a view similar to FIG. 1 illustrating the action of the tensile force on the articles held and the locking action of the clip relative to the clamp body.
Figure 8:
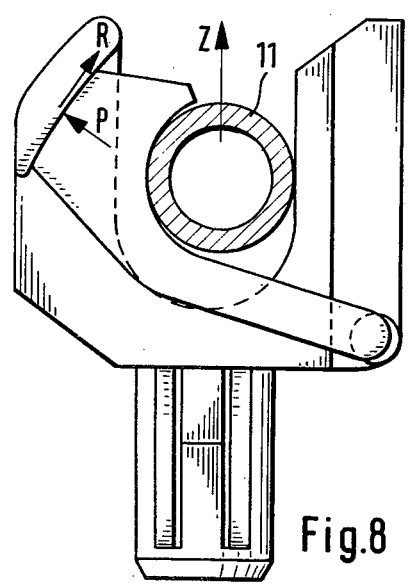
FIG. 8 is a view similar to FIG. 7 illustrating a similar action with respect to a large diameter article.
Figure 2:
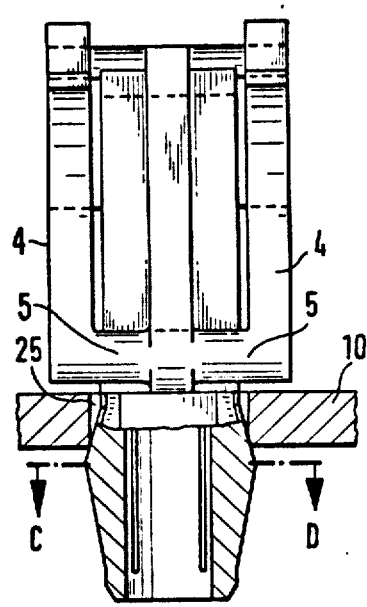
FIG. 2 is a cross-sectional view of the mounting foot for the clamp taken along lines A–B in FIG. 1 and with the remaining portion of the clamp illustrated in elevation.
Figure 1:
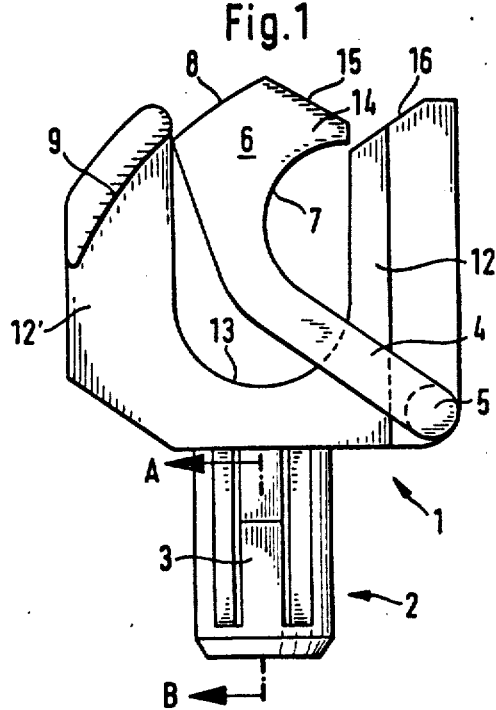
FIG. 1 is a side elevational view of an embodiment of a clamp constructed in accordance with the present invention.
Figure 3:
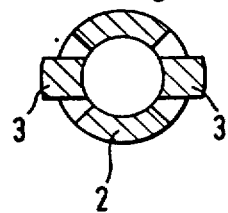
FIG. 3 is a cross-sectional view thereof taken generally about on lines C–D in FIG. 2.
Figure 4:
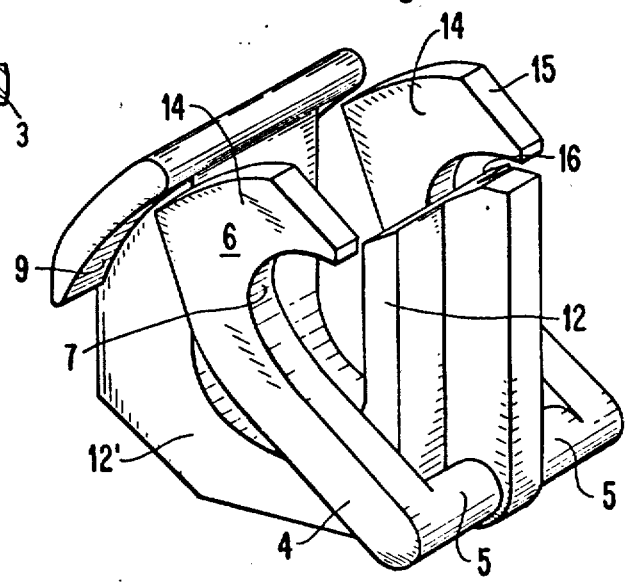
FIG. 4 is a perspective view of the clamp body.

The preferred embodiment of the clamp of the present invention is illustrated in FIG. 1 and comprises a generally channel-shaped body generally designated 1, for holding a round bar or article 11 (FIG. 7). The clamp includes means carried by the body for securing the clamp to a support. As here embodied, the securing means includes a mounting foot 2 having resilient spring legs 3 suitably secured to body 1. The clamp may thus be anchored in an aperture 25 of a plate-like support 10, e.g. an automobile body plate (FIG. 2). It will be understood that other types of attachment normally employed in automotive engineering such as split riveting and blind riveting may also be utilized to secure the clamp to support 10.

As illustrated in FIG. 1 and here embodied, the channel-shaped body 1 has a bottom or base 13 and a pair of legs or walls 12 and 12' spaced one from the other and defining an opening therebetween. As illustrated in FIGS. 4–8, the round article or bar 11 to be held is clamped between a pair of clamps or clips 4 and the channel sidewall or leg 12. To this end, each clamp or clip 4 is integral with a resilient swivel or twistable pin 5 located adjacent the juncture of leg 12 and base 13. Each swivel pin 5 is disposed about an axis parallel to the channel axis and has a shape and length such that the clip 4 carried thereby can be swung between the extreme positions shown by the dot-dash lines in FIG. 6.

Figure 5:
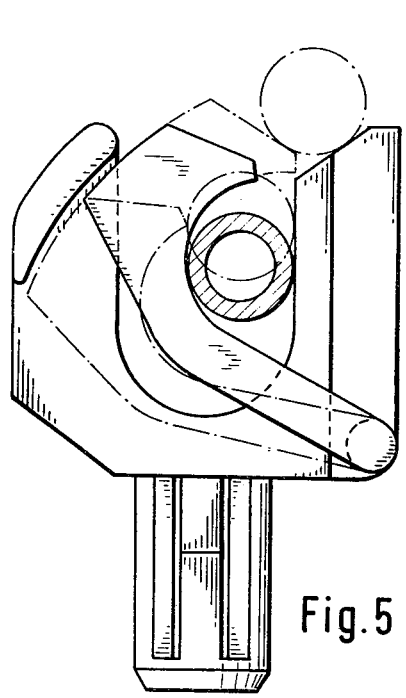
FIGS. 5 and 6 are views similar to FIG. 1 illustrating the clamp holding relatively small and large diameter articles respectively.
Figure 6:
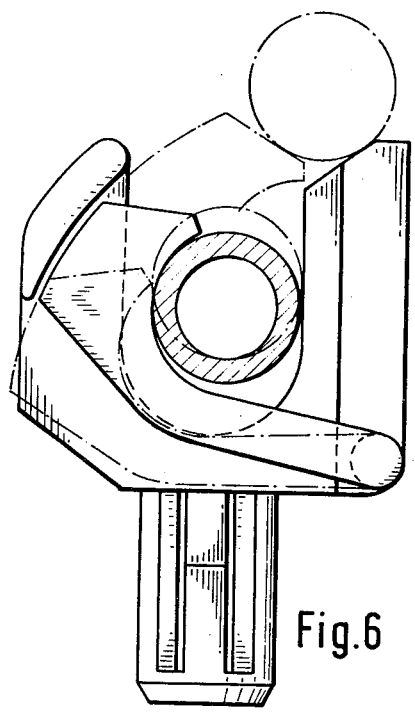

It will be appreciated from a review of FIGS. 1–8 that a pair of clips 4 are utilized to secure an article to the clamp with the clips symmetrically retaining and bearing against the article on opposite sides of the channel-shaped body. However, it will be appreciated that a single clip could be utilized in the same configuration, location and action as one of the clips described herein and illustrated. Also, the clips are preferably formed of a one-piece plastic molded construction. Thus, the swivel pins 5 locate the clips 4 in the position illustrated in FIG. 1. Movement from that position, for example, toward the lowermost dot-dash position illustrated in FIG. 6 is against the natural bias of the material forming pins 5 and this natural bias tends to displace the clip toward its normal position illustrated in FIG. 1.

Each of clips 4 has a holding portion or head 6 for gripping the round bar or article 11. Particularly, each head 6 including a clamping edge or first surface 7 shaped to correspond to the largest diameter of round bar or article 11 to be clamped and for engaging the article to retain the article in the clamp. In the embodiment illustrated in FIGS. 1–8, the article is clamped between the clips 4, particularly first surfaces 7, and the leg 12 of the channel-shaped body. Thus, the bias of the clips for movement toward leg 12 tends to maintain the article engaged between surfaces 7 and leg 12.

Each head 6 also has a second surface or outer wall 8. Preferably, second surface 8 is arcuately shaped and particularly is coincident with the arc of a circle whose midpoint or axis coincides with the axis of rotation of swivel pin 5. In accordance with the invention, outer wall or second surface 8 is movable in closely spaced relation to a supporting wall or surface portion 9 which projects laterally from the opposite channel wall or leg 12'. The supporting wall or surface portion 9 likewise extends arcuately, preferably in a circular arc, about the axis of rotation of swivel pins 5.

Each clip 4 and surface 9 are dimensioned such that outer wall or second surface 8 is in abutting engagement with supporting wall surface 9 upon application of a tensile force Z on a round bar or article 11 engaged between clips 4 and leg 12 as a result of the flexible resilience of pin 5. This is clearly illustrated in FIG. 8. That is, a camming action occurs by the cooperation of the first surfaces 7 and channel wall 12 generating a force P, proportional to tensile force Z, which causes the outer wall or second surfaces 8 to be urged into abutment upon application of a force Z to the article in the direction indicated by the arrows in FIGS. 7 and 8. This in turn generates a resultant frictional resistance R (See FIGS. 7 and 8) preventing the clips from swiveling back to a position permitting the article to pass outwardly between the clips 4 and the leg 12. Nonetheless, round bar or article 11 can be readily removed from the clamps by manually pressing clips 4 toward base 13 until noses 14 clear the article enabling its withdrawal.

Noses 14 and channel wall or leg 12 are also provided with edges or third and fourth surfaces 15 and 16 respectively which are bevelled or inclined towards channel bottom or base 13 and one another. This facilittes introduction or insertion of round bars or articles 11 into the opening of the clamp between its opposite legs by enabling the clips to be pivoted toward base 13 upon pushing the article against the clip. Once the article moves past the noses 14 of clips 6, the clips will snap back under the bias or resiliency of pins 5 toward their full line position illustrated in FIG. 1 to clamp the article between the first surfaces 7 and leg 12.

It will be understood that channel body 1 can be secured with channel wall or leg 12 abutting base 10. That is, the mounting means 2 can be secured to leg 12 rather than base 13, if desired, and without change in the operation of the clamp.

In the clamp holder illustrated in FIGS. 9-11, corresponding elements are denoted by like reference numerals applied in the embodiment of FIGS. 1-8 followed by the letter suffix a. In this embodiment, round bar or article 11 is clamped between pairs of clips 17, which pairs move toward and away from one another. Clips 17 are fastened mutually symmetrically or medially of channel bottom or base 13a to swivel outwardly to receive an article and toward one another to secure the article within the clamp. Opposed clips 17 are attached to the channel-shaped body by pins 19 which project laterally of the body and have downwardly inclined bearing faces 20 respectively integral with the foot ends 18 of clips 17. Pins 19 are thus split with the bearing faces 20 spaced one from the other and from the center of the pins so as to improve the spring action of bearing faces 20 and the clips carried thereby. The pin walls 22 of pins 19 define a slot 21 therebetween. Bearing faces 20 terminate a short distance from channel body 1a. Under the action of tensile forces on round bar 11, the slots 21 have a favorable effect because faces 20 can rebound more readily upwards, thereby forcing outer edges 8a of clip 17 into flatwise abutting engagement with supporting edges 9a, similarly as described in connection with the embodiment of FIGS. 1-8.

In the embodiment of FIGS. 9-11, noses 14a of clips 17 lie in close proximity to each other when there is no load, e.g. prior to securing a round bar 11. Their upper ends also have edges 15a bevelled or inclined toward one another and toward channel bottom 13a so that, upon insertion of round bar 11, clips 17 are displaced away from each other.

Alternatively, instead of arcuately shaped clamping surfaces 7 as used in the first embodiment, two clamping surfaces 23 and 24 are provided. These surfaces are disposed at an obtuse angle with respect to one another and provide a double support upon round bar 11 in tangential direction. Surfaces 23, which grip the rear of round bar 11, are preferably formed in such a manner that they extend parallel to a chord along outer surface 8a, that is, parallel to a line drawn through both terminal points of outer surface 8a, thus ensuring an abutment of clips 17 to supporting surfaces 7a upon application of tensile forces Z in like manner as previously described with respect to the embodiment illustrated in FIGS. 1-8. That is, movement of the article 11 in the direction of the arrow in FIG. 11 upon application of force Z in that direction, cams surfaces 8a into frictional engagement with surfaces 9a. The frictional resistance generated by this engagement produces a frictional force resisting movement of clips 17 into positions permitting the article 11 to be removed from the clamp. It will be appreciated, however, that the article 11 can be readily released from the clamp simply by manual movement of the clips 17 away from one another thus separating noses 14a to enable the article to be withdrawn from within the opening of the channel-shaped body.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

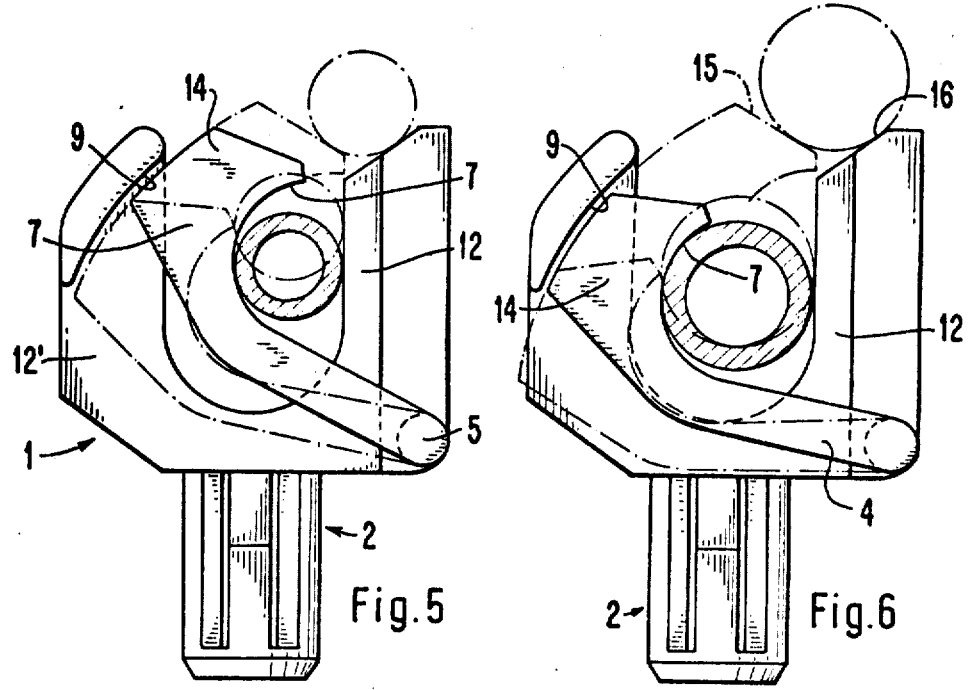
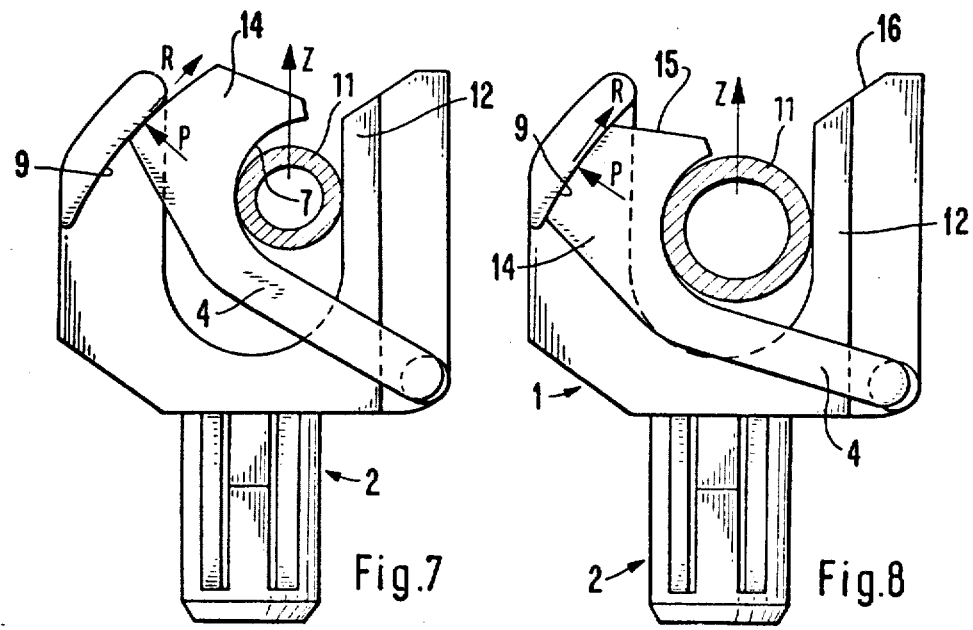

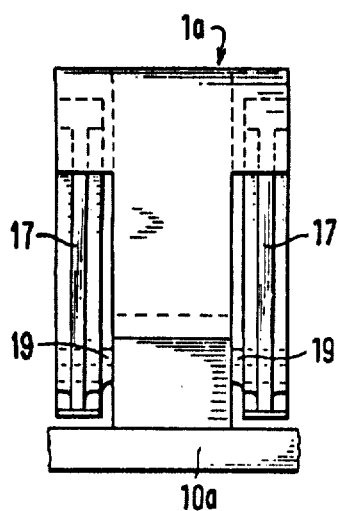
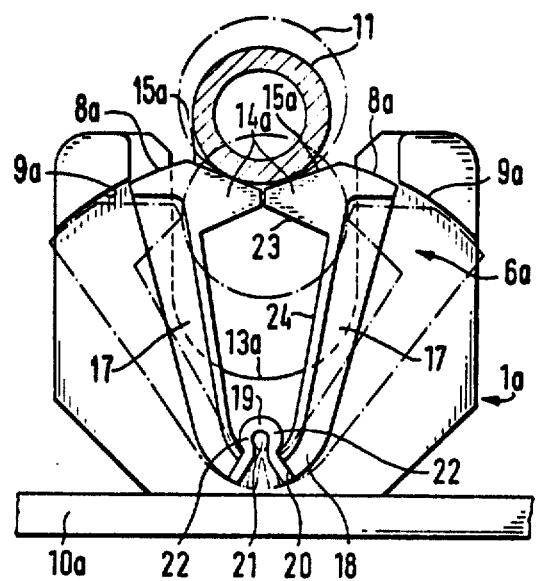
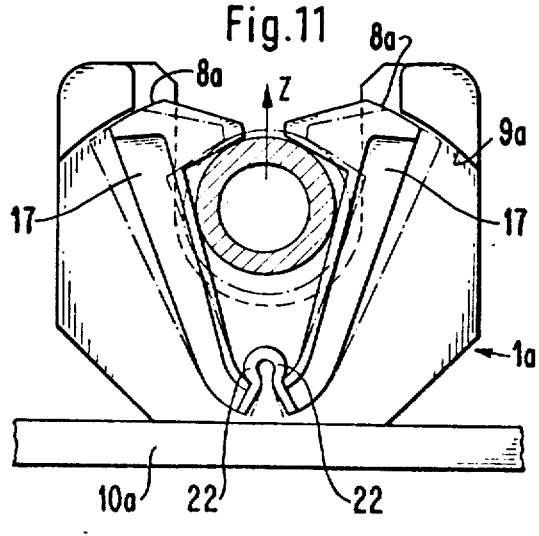

What is claimed and desired to be secured by United States Letters Patent is:

1. A clamp for securing a generally round article to a support comprising:
    a generally channel-shaped body having a base and a pair of legs spaced one from the other and defining an opening therebetween,
    a clip having a clamping head including a first surface for engaging the article to retain the article in said clamp, and
    a resilient, twistable pin integral with said clip for pivotally mounting said clip to said body for movement through at least part of said opening and between a position for retaining the article in the clamp and a position for opening the clamp to receive the article in or remove the article from the clamp, the resiliency of the pin biasing the clip toward the article-retaining position,
    one of said legs having a surface portion in opposition to said head when said head retains an article in said clamp, said head having a second surface engageable with the surface portion of said one leg in response to a force on the article engaged by said clamping head surface in a direction away from said base and outwardly of said opening, thereby tending to flex the resilient pin, to retain the clip substantially in its article-retaining position.

2. A clamp according to claim 1 wherein said second surface and said surface portion lie along and are coincident with arcs of concentric circles having a common center coincident with the axis of rotation of said clip.

3. A clamp according to claim 2 wherein said axis of rotation of said clip lies adjacent the juncture of the other of said legs and said base, said surface portion lying adjacent the tip of said one leg.

4. A clamp according to claim 3 wherein said first surface cooperates with said other leg to clamp the article therebetween when said clip lies in its article-retaining position.

5. A clamp according to claim 1 wheren the axis of rotation of said clip lies adjacent the juncture of the other of said legs and said base, said surface portion lying adjacent the tip of said one leg, said head having a third surface inclined toward said base, whereby said third surface facilitates movement of said clip in a direction toward its clamp open position in response to movement of the article bearing along said third surface in a direction toward said base.

6. A clamp according to claim 5 including a fourth surface carried by the tip of said other leg, said fourth surface being inclined toward said base and said third surface to guide the article into the channel opening and against said third surface.

7. A clamp according to claim 5 including means for biasing said clip for movement into a predetermined position, said clip extending from its axis of rotation toward said surface portion when in said predetermined position and movable toward said base and against the bias of said biasing means in response to movement of the article bearing along said third surface in a direction toward said base.

8. A clamp according to claim 1 including a second clip pivotally carried by said body for movement through at least part of said channel-shaped opening and between a position for retaining the article in the clamp and a position for opening the clamp to receive the article in or remove the article from the clamp, said second clip having a clamping head including a first surface for engaging the article to retain the article in the clamp, one of said legs having a surface portion in opposition to the head carried by said second clip when the latter head retains an article in said clamp, the latter head having a second surface engageable with the surface portion carried by the latter mentioned one leg in response to a force on the article engaged by the head of said second clip in a direction away from said base and toward said opening to retain said second clip substantially in its article-retaining position.

9. A clamp according to claim 8 wherein the second surface of said second clip and the surface portion of the latter mentioned one leg lie along and are coincident with arcs of concentric circles having a common center coincident with the axis of rotation of said second clip.

10. A clamp according to claim 9 wherein the second surface of the first mentioned clip and the first mentioned surface portion lie along and are coincident with arcs of concentric circles having a common center coincident with the axis of rotation of the first mentioned clip.

11. A clamp according to claim 10 wherein the axes of rotation of the first mentioned clip and said second clip are coincident one with the other, said coincident axis lying adjacent the juncture of the other of said legs and said base, said surface portions lying adjacent the tip of said one leg, said first and second legs extending along opposite sides of said one leg.

12. A clamp according to claim 8 wherein the first mentioned clip and said second clip lie in opposition one to the other and are rotatable toward one another into their respective article-retaining positions and away from one another into their respective article-receiving or removing positions.

* * * * *

UNITED STATES PATENT AND TRADEMARK OFFICE
CERTIFICATE OF CORRECTION

PATENT NO. : 4,213,589

DATED : July 22, 1980

INVENTOR(S) : Claude Pierron, et al

It is certified that error appears in the above—identified patent and that said Letters Patent is hereby corrected as shown below:

The sheets of drawing showing figs. 1-11 should appear as shown on the attached sheets.

Signed and Sealed this

Twelfth Day of January 1982

[SEAL]

Attest:

Attesting Officer

GERALD J. MOSSINGHOFF

Commissioner of Patents and Trademarks